(12) United States Patent
Rauscher

(10) Patent No.: US 6,633,762 B1
(45) Date of Patent: Oct. 14, 2003

(54) SMART MOBILE ASSISTED HANDOFF (MAHO) METHOD THAT DISABLES MAHO

(75) Inventor: Mary Ellen Rauscher, White House Station, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/369,337

(22) Filed: Aug. 6, 1999

(51) Int. Cl.[7] .................................................. H04Q 7/20
(52) U.S. Cl. ...................... 455/437; 455/161.3; 370/331
(58) Field of Search ................... 455/437, 438, 455/456, 69, 442, 515, 70, 574, 161.1, 161.2, 161.3, 434; 370/331–334

(56) References Cited

U.S. PATENT DOCUMENTS

| | | | |
|---|---|---|---|
| 5,179,559 A | | 1/1993 | Crisler et al. |
| 5,517,674 A | | 5/1996 | Rune |
| 6,167,268 A | * | 12/2000 | Souissi et al. ............... 455/434 |
| 6,173,181 B1 | * | 1/2001 | Losh ........................... 370/329 |
| 6,289,211 B1 | * | 9/2001 | Koorapaty et al. ......... 455/404 |
| 6,424,833 B1 | * | 7/2002 | Iizuka et al. ................ 455/436 |

FOREIGN PATENT DOCUMENTS

GB      2305825      4/1997

* cited by examiner

*Primary Examiner*—Nay Maung
*Assistant Examiner*—Nick Corsaro

(57) ABSTRACT

The present invention provides a methodology for selectively enabling and disabling mobile assisted handoff (MAHO) in a TDMA wireless communication system on a per-mobile station basis based on a triggering signal. The triggering signal identifies the mobile station or set of mobile stations for which the MAHO feature is to be disabled. The triggering signal may originate at a base station or a mobile switching center (MSC) by a system technician. The triggering signal may also originate from a served mobile station and contain information about a position of the served mobile station. In this latter case, if the served mobile station has not moved from a previous position, the serving base station disables MAHO for the served mobile station. A MAHO disable signal uniquely identifies those mobile stations for which MAHO is to be disabled. When a served mobile station receives such a disable signal, it ceases to transmit signal quality information. Alternatively, MAHO is constantly enabled for the served mobile station, and the serving base station selectively processes channel quality information based on movement of the served mobile station.

33 Claims, 3 Drawing Sheets

SMART MOBILE ASSISTED HANDOFF (MAHO) METHOD THAT DISABLES MAHO

BACKGROUND OF THE INVENTION

1. Field of the Invention

The present invention relates to wireless communication systems, and more specifically, to turning on and off a Mobile Assisted Handoff (MAHO) feature in a mobile station during a call.

2. Description of the Related Art

Time Division Multiple Access (TDMA) is a known implementation of multiple communication channels by using different time slots in a shared frequency. Transmission from mobile stations typically occurs in bursts in the uplink direction, with only one mobile station transmitting to a base station at any given time. In the downlink direction, the base station is usually transmitting continuously, with the mobile stations listening only during their assigned time slot.

In TDMA cellular systems, a technique known as mobile assisted hand off (MAHO) is used. During a call, channel quality between a mobile station and a serving base station may degrade such that a handoff of the call to another base station becomes necessary. Conventional MAHO is a process in which mobile telephones assist in handoff decisions by sending radio channel quality information back to the serving base station. A serving base station is a base station handling the communication needs of mobile stations within a certain coverage area, sometimes referred to as a cell. A mobile station whose communication signals are being handled by a serving base station is referred to a served mobile station.

TDMA systems use two types of radio channel quality information: a received signal strength indicator (RSSI) of channels from surrounding base stations, and an estimated bit error rate (BER) of a served mobile station's operating traffic channel. The bit error rate (BER) is estimated using the result of forward error correction codes for speech data and call processing messages. Having a served mobile station report quality information also allows for measurements of the uplink and downlink RF signal quality that are not possible from a serving base station. The served mobile station typically reports channel quality information on either of a Slow Associated Control Channel (SACCH) or a Fast Associated Control Channel (FACCH).

Using MAHO signal measurements from mobile stations, a serving base station of a cellular system can decide when a handoff may be necessary. The MAHO information from mobiles also reduces data traffic between adjacent base stations.

During the conventional MAHO process, a serving base station sends a served mobile station a Measurement Order message containing a list of radio channels corresponding to the setup channels/broadcast control channels (BCCH) from up to 12 neighbor nonserving base stations for nonserving cells (but usually only six nonserving neighboring cells are measured). During its idle time slots, the served mobile measures the channel quality of the channels on the list including the traffic channel it is currently operating on for its particular serving base station. The served mobile averages the channel quality measurements, then continuously sends MAHO channel quality reports back to its serving base station periodically over either an SACCH or FACCH. However, the serving base station may send a Stop Measurement Order message to terminate all channel quality measurements and reports within its coverage area. In response, every served mobile station ceases making channel quality measurements and reports.

A mobile switching center (MSC) combines the MAHO measurements with its own information such as knowing which cells have available idle voice or digital traffic channels to determine which radio channel will offer the best quality. The mobile switching center allocates the best channel when a call handoff is required.

MAHO as conventionally implemented is a feature that is constantly on in mobile stations to ensure continuous mobile wireless TDMA communication. However, processing all channel quality measurements taken during all mobile stations' unassigned time slots causes a heavy computational load on the serving base station. Also, the SACCH and FACCH become polluted with channel quality measurement data from all mobile stations within a coverage area.

Conventionally, even mobile stations which are stationary, and whose signal quality is not changing, are constantly collecting and transmitting signal quality measurements. Hence, there exists a need for a process which will ensure continuous mobile wireless TDMA communication, but which will reduce the computational load on the serving base station, and free the SACCH and FACCH for other messages.

SUMMARY OF THE INVENTION

Accordingly, the present invention is directed to a method for selectively disabling a mobile assisted handoff (MAHO) feature that substantially obviates one or more of the problems due to limitations and disadvantages of the related art.

The present invention provides a methodology for selectively enabling and disabling MAHO in a TDMA wireless communication system on a per-mobile station basis based on a triggering signal received at a serving base station.

In one embodiment of the present invention, the triggering signal is originated at an input device at a base station or the MSC. The triggering signal specifies the mobile station or set of mobile stations for which the MAHO feature is to be disabled. The serving base station then transmits a MAHO disable signal uniquely identifying those mobile stations for which MAHO is to be disabled.

In another embodiment of the invention, the triggering signal is originated from a served mobile station and contains information from which a relative position of the served mobile station may be derived. If the served mobile station has not moved from a previous position, the serving base station transmits a MAHO disable signal. If the served mobile station has moved from a previous position, the serving base station transmits a MAHO enable signal. The position information in the triggering signal may indicate a signal propagation delay between the base and mobile station, or it may indicate coordinates of the mobile station.

In another embodiment of the invention, the served mobile station constantly transmits channel quality measurements as in conventional MAHO, in addition to the triggering signals from which position may be derived. If the serving base station determines that the served mobile station has not moved, the serving base station does not process the received channel quality information.

BRIEF DESCRIPTION OF THE DRAWINGS

The accompanying drawings are included to provide a further understanding of the invention and are incorporated in and constitute a part of this specification, illustrate one embodiment of the invention and together with the description serve to explain the principles of the invention.

DETAILED DESCRIPTION OF THE INVENTION

Reference will now be made in detail to the present preferred embodiments of the invention, examples of which are illustrated in the accompanying drawings.

Figure 1:
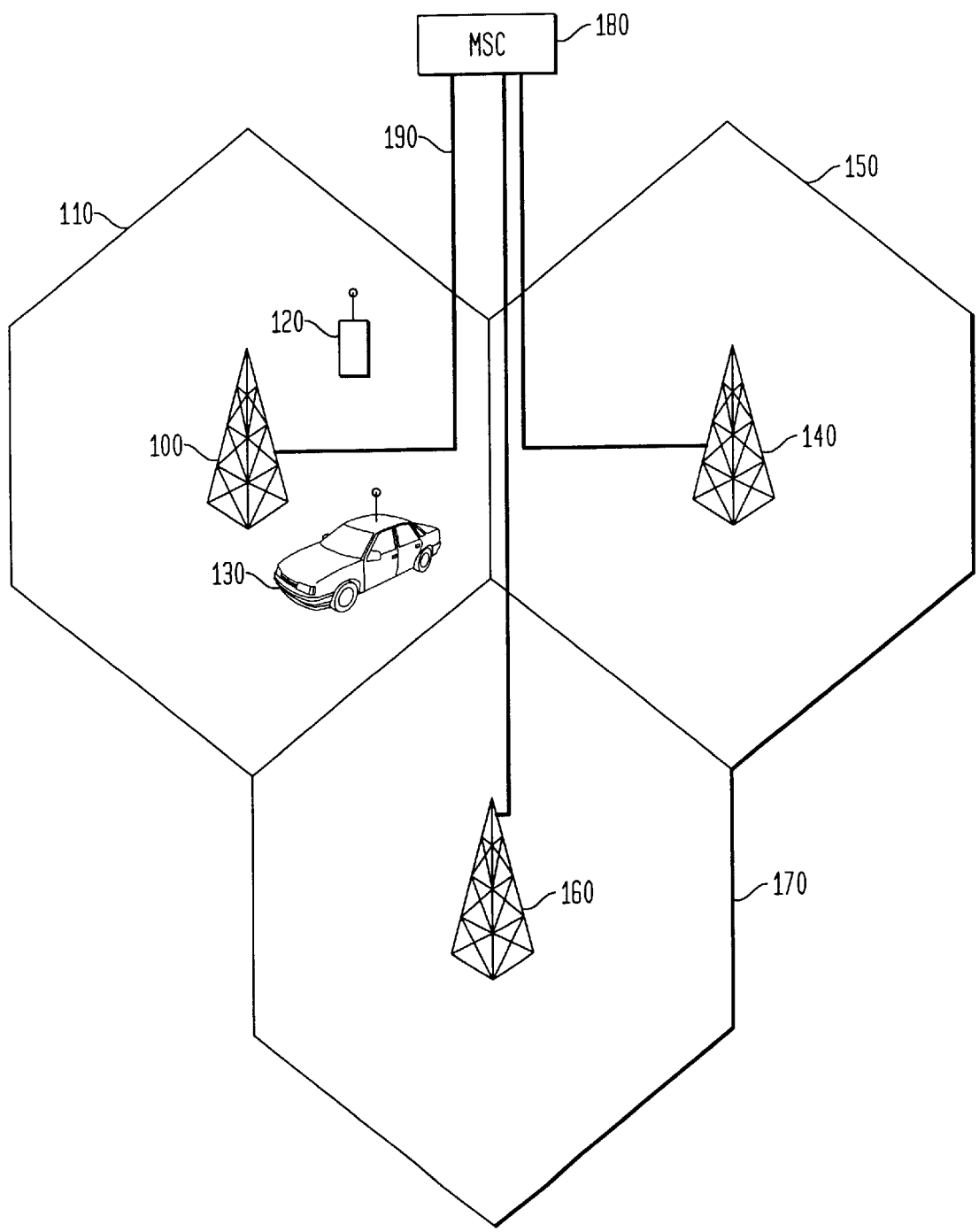
FIG. 1 illustrates an arrangement of base stations and mobile stations in which the present invention may be practiced.

FIG. 1 illustrates an arrangement of base stations and mobile stations in a TDMA communication system according to the present invention. Serving base station 100 transmits over a coverage area 110. Within this coverage area are located mobile stations, of which mobile stations 120 and 130 are shown as an example. Similarly, neighboring mobile stations 140 and 160 have coverage areas 150 and 170 bordering coverage area 110. All of the base stations 100, 140, and 160 are connected to a mobile switching center (MSC), which performs channel allocation and network control functions for the communication system, by wires 190.

Mobile station 120 is intended to illustrate a stationary mobile station, whereas mobile station 130 is intended to illustrate a moving mobile station, for example a mobile telephone located in a moving automobile. However, mobile station 130 could also be moving by virtue of its user walking, bicycling, riding a train or otherwise moving during a call on the mobile station. For the purposes of illustration, both mobile stations 120 and 130 are in the midst of a call, and thus are served mobile stations associated with the serving base station 100.

One embodiment of the present invention includes selectively disabling a MAHO feature in mobile stations on a per mobile basis. Where a conventional serving base station may only enable or disable MAHO for all mobile units within its coverage area, serving base station 100 disables the MAHO feature in some mobile stations (e.g., mobile station 120), but does not disable the MAHO feature in other mobile stations (e.g., mobile station 130) within its coverage area 110. In order to accomplish such disabling on a per mobile station basis, the serving base station 100 must be able to direct MAHO disabling signals to individual mobile stations. Different ways of directing such disabling signals will be discussed later. Serving base station 100 selectively disables the MAHO feature as outlined above in response to a triggering signal. Thus, one embodiment of the invention includes a method for selectively disabling a mobile assisted handoff (MAHO) feature, including receiving a triggering signal at a serving base station, determining whether to disable the MAHO feature in at least one served mobile station based on the triggering signal, and disabling the MAHO feature on a per mobile station basis.

There are at least two originating points for the triggering signal: a non-mobile station (e.g., one of base stations 100, 140, or 160; or MSC 180) and a mobile station (e.g., 120 or 130). In one embodiment of the invention, the triggering signal is originated by, for example, a servicing technician at a base station or the MSC via an input device (not shown) at the base station or MSC. Such a technician, via the input device, specifies the mobile station or set of mobile stations for which the MAHO feature is to be disabled. This set of mobile stations may be chosen to reduce the processing load on the serving base station, to reduce signal traffic in the SACCH and FACCH, or for some other reason. A triggering signal is then sent from the input device to the serving base station, which generates a MAHO disable signal, or series of signals, directed to the mobile stations for which MAHO is to be disabled.

The MAHO disable signal generated by the serving base station and transmitted by the serving base station 100 may uniquely identify served mobile stations for which MAHO is to be disabled in several ways. One way is to transmit a MAHO disable signal on the served mobile's communication channel in the particular time slot during which it will be listening. In such a method of selectively disabling MAHO, serving base station 100 will transmit a series of MAHO disable signals during different time slots corresponding to those served mobile stations for which MAHO is to be disabled. Another way in which served mobile stations may be uniquely identified in a MAHO disable signal is to include identification codes unique to each such mobile station within the disable signal. In such case, the MAHO disable signal could be transmitted over, for example, a paging channel or control channel to which all served mobiles are listening. Then, only the served mobile stations whose identification codes were contained within the disable signal would disable MAHO and cease measuring and transmitting channel quality information. Other specific implementations of uniquely identifying served mobile stations for which MAHO is to be disabled will be apparent to those skilled in the art.

In another embodiment of the invention, the triggering signal originates from a served mobile station. In this embodiment, the triggering signal contains information from which a relative position of the served mobile station may be derived. The serving base station determines from the triggering signal whether the current position of the served mobile station differs from a previous position, in other words, whether the served mobile station has moved. A method according to this embodiment enables MAHO if a mobile station, such as mobile station 130 in FIG. 1, is moving, and thus its signal quality is changing. However, if a mobile station, such as mobile station 120 in FIG. 1, is not moving, the serving base station disables MAHO for the mobile station, because the associated signal quality is not changing. Thus, the serving base station receives a triggering signal from a served mobile station via serving base station 100, and decides to disable the MAHO feature in the served mobile station if the served mobile station has not moved from its previous position.

The above method assumes an initial state and default condition of MAHO being on, and it disables MAHO if the served mobile station remains stationary. See FIGS. 2 and 3. In other words, when a call is initially established, MAHO is on. However, the initial state and default condition alternatively could be MAHO being off. In such an alternate regime, MAHO is off when the call is initially established, and MAHO is then enabled if the served mobile station moves.

If, as described above, the MAHO feature for the served mobile station 120 has been disabled, and if the served mobile station 120 then moves from its previous position, serving base station 100 then re-enables MAHO for the mobile station. A wireless communication system as described above which can automatically turn a MAHO feature on and off for served mobile stations is said to have a "Smart MAHO" capability.

There are several ways of deriving a relative position of a served mobile station relative to a serving base station. These ways may be broadly classed as 1) methods that do not require a hardware modification of conventional mobile stations, and 2) methods that require a hardware modification of conventional mobile stations. The first class of methods is preferred for implementing a Smart MAHO capability in existing mobile communication systems.

A preferred method for deriving the relative position of a served mobile station which does not require any hardware modification is based on a measured signal propagation time delay between the served mobile station and the serving base station. Conventional TDMA systems, such as those operating according to IS-136 protocols, are able to periodically measure the propagation delay between the served mobile station and the serving base station. The specific technique for measuring delays being known, it will not be further elaborated here. In such conventional systems, the serving base station measures the signal propagation delay and sends an appropriate time alignment message to the mobile station via FACCH or SACCH. The mobile station then conventionally uses the time alignment message to compensate for the propagation delay between it and the serving base station. The present invention stores the time alignment at a given time, and compares it with the next time alignment to determine whether the served mobile has moved, or changed its relative position. The triggering signal described above is whatever signal is conventionally used by the serving base station to calculate propagation delay.

Figure 2:
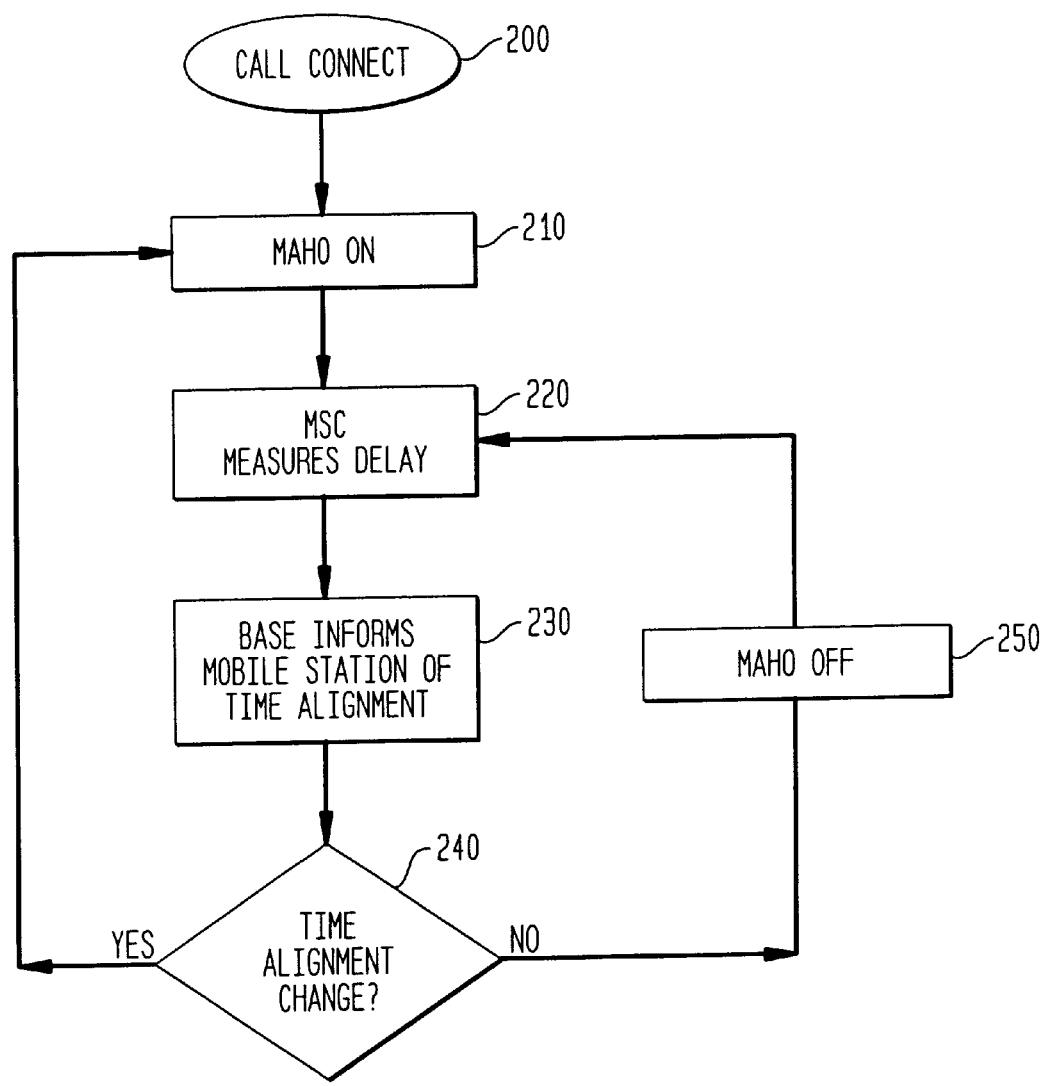
FIG. 2 illustrates a flow diagram according to one embodiment of the present invention.

A preferred method for selectively disabling MAHO using propagation delay is shown in FIG. 2. In step 200, a call connection is established between a serving base station and a served mobile station. Next MAHO is turned on for the served mobile station in step 210. The serving base station then measures a signal propagation delay between the serving base station and the served mobile unit in step 220. The serving base station generates a time alignment based on the delay and stores this time alignment in an internal memory. The serving base station then sends the time alignment signal to the mobile station in step 230. The serving base station compares the stored time alignment with a previously stored time alignment in step 240. If the time alignment has not changed, the serving base station turns MAHO off for the served mobile station by causing a MAHO disable signal to be transmitted to the served mobile station in step 250. If the time alignment has changed, the serving base station turns MAHO on for the served mobile station by causing a MAHO enable signal to be transmitted to the served mobile station in step 210. Thus, the above method includes the serving base station deriving a relative position of the served mobile station from a signal propagation time delay between the served mobile station and the serving base station and enabling or disabling MAHO in the served mobile station accordingly.

To avoid sending MAHO disable signals to a mobile station with MAHO already disabled, and to avoid similarly redundant MAHO enable signals, the serving base station may store, in addition to the previous time alignment, whether MAHO is currently enabled or disabled for the served mobile station. In such a case, for example, if MAHO had been turned off for a mobile station, and if there was no time alignment change in step 240 (i.e., the mobile station had remained stationary), the serving base station would recognize the current disabled MAHO state in step 250 and not send out a redundant MAHO disable signal.

The above propagation delay is, of course, related to the radial distance between the base station and the mobile station. So if a mobile station were to move in a perfect circle of constant radius around the serving base station, there would be substantially no time alignment change. However, such perfect circular movement is unlikely, and mobile station movement in actual wireless systems will be accompanied by at least some measurable movement in the radial direction.

Another preferred method for deriving the relative position of a served mobile station which does not require any hardware modification is based on an estimated bit error rate (BER) from the serving base station. Where the above method used a difference in position to infer a possible change in channel quality requiring MAHO, this preferred method uses a change in bit error rate from the serving base station, which is more directly related to a change in channel quality. To implement such a method, the served mobile station transmits a BER to the serving base station, and the serving base station compares the current BER with a previously stored BER. If the BER is the same or less than the previously stored BER, MAHO is disabled. However, if the BER has increased, MAHO is enabled. In this case, the triggering signal is the signal transmitted from the mobile station containing the BER.

A preferred method for deriving the relative position of a served mobile station which does require a hardware modification of the mobile station involves the use of global positioning system (GPS) signals. GPS receivers may be added with relative ease to existing mobile station designs.

Figure 3:
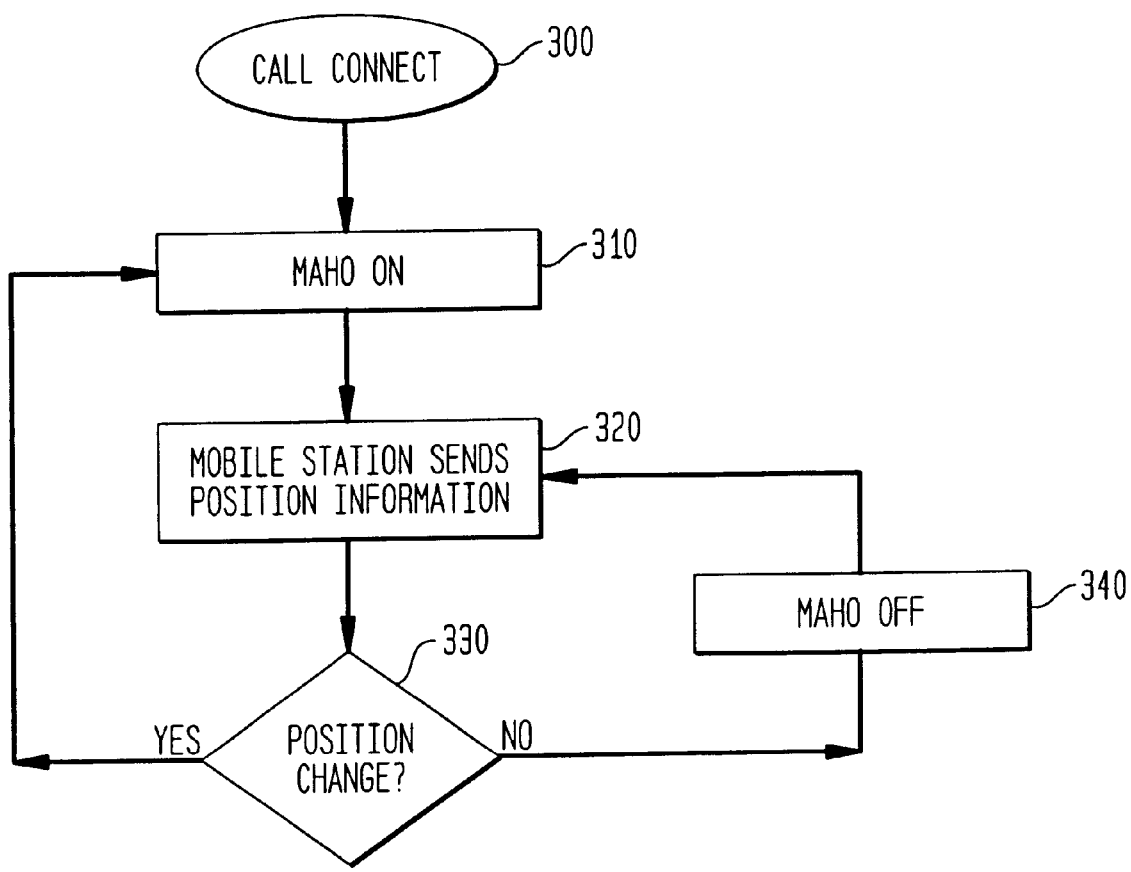
FIG. 3 illustrates a flow diagram according to another embodiment of the present invention.

So modified, a wireless communication system like that shown in FIG. 1 performs a method for selectively disabling MAHO using GPS signals shown in FIG. 3. In step 300, a call connection is established between a serving base station and a served mobile station. Next MAHO is turned on for the served mobile station in step 310. The served mobile station then sends GPS position information from its GPS receiver to the serving base station in step 320. The GPS information may be either coordinates or a signal from which coordinates may be calculated by the serving base station. The serving base station then stores the received GPS position in an internal memory. The serving base station next compares the stored GPS position of the served mobile station with a previously stored position in step 330. If the position of the served mobile station has not changed, the serving base station turns MAHO off for the served mobile station by causing a MAHO disable signal to be transmitted to the served mobile station in step 340. If the position has changed, the serving base station turns MAHO on for the served mobile station by causing a MAHO enable signal to be transmitted to the served mobile station in step 310. In this case, the triggering signal is the signal transmitted from the mobile station containing the GPS position information. Thus, the above method includes the serving base station deriving a position of the served mobile station from an output of a GPS receiver included in the triggering signal, and enabling or disabling MAHO in the served mobile station accordingly.

As mentioned above for the method shown in FIG. 2, redundant MAHO enable and disable signals may be avoided in the method of FIG. 3 by storing in the serving base station, in addition to the previous position, whether MAHO is currently enabled or disabled for the served mobile station. In this manner, the serving base station can avoid sending out, for example, a MAHO disable signal to a mobile station where MAHO is currently disabled.

Other possible hardware modifications for the served mobile station for use in sensing a change in position include an inertial sensor or a sonar-type sensor. Another such possible hardware modification is adding a button for the user to push when the mobile station is stationary.

In the above methods, the serving base station may determine to enable MAHO if any detectable movement (or change in BER) of the served mobile station occurs. Alternatively, there may be some threshold (e.g., a meter or several meters) of movement between comparisons below which MAHO will remain disabled. If such a movement threshold is exceeded, then MAHO would be enabled.

In another embodiment of the invention, the above methods are modified to reduce the computational load on the serving base station, though the SACCH and FACCH contain the same volume of channel quality measurements as in conventional MAHO schemes. In this embodiment, the served mobile station constantly transmits channel quality measurements as in conventional MAHO, in addition to the triggering signals from which position (or BER) may be derived. The serving base station, as described in the above methods, determines whether the served mobile station has moved from a previous position (or whether its BER has degraded).

If the served mobile station has not moved (or its BER has not degraded), the serving base station simply does not process the received channel quality information. The serving base station "dumps," or ignores, the channel quality information when the mobile is stationary, thereby decreasing its processing load. In this embodiment, MAHO enable/disable communication with the served mobile station is avoided, at the expense of a relatively high volume of channel quality measurements in the SACCH and FACCH. If and when the serving base station determines that the served mobile station has started to move (or the BER increases), the serving base station begins processing the received channel quality measurements again for MAHO. Also as in the above methods, the triggering signal may be originated by, for example, a servicing technician at a base station or the MSC via an input device (not shown) at the base station or MSC. Such a technician, via the input device, specifies the served mobile station or set of mobile stations for which the channel quality measurements are not to be processed by the serving base station.

It will be apparent to those skilled in the art that various modifications and variations can be made in the embodiments of the present invention without departing from the spirit or scope of the invention. Thus, it is intended that the present invention cover the modifications and variations of this invention provided they come within the scope of the appended claims and their equivalents.

What is claimed is:

1. A method for selectively disabling a mobile assisted handoff (MAHO) feature, comprising:
   receiving a triggering signal at a serving base station;
   determining at the serving base station whether to disable the MAHO feature in at least one served mobile station based on the triggering signal; and
   disabling the MAHO feature on each served mobile station for which the determining step determines to disable the MAHO feature based on the triggering signal.

2. The method of claim 1, wherein the triggering signal is received via an input device at one of a base station and a mobile switching center.

3. The method of claim 2, wherein the triggering signal specifies each served mobile station for which the MAHO feature is to be disabled.

4. The method of claim 1, wherein the triggering signal is received from a served mobile station, and the determining step includes:
   determining from the triggering signal whether the served mobile station has moved from a previous position, and
   deciding to disable the MAHO feature in the served mobile station if the served mobile station has not moved from its previous position.

5. The method of claim 4, further comprising:
   enabling the MAHO feature for the served mobile station if the MAHO feature for the served mobile station has been disabled, and if the served mobile station has moved from its previous position.

6. The method of claim 4, wherein the determining from the triggering signal step includes:
   deriving a relative position of the served mobile station from a signal propagation time delay between the served mobile station and the serving base station.

7. The method of claim 4, wherein the determining from the triggering signal step includes:
   deriving a relative position of the served mobile station from an output of a position measuring means included in the triggering signal.

8. The method of claim 7, wherein the position measuring means includes a global positioning system (GPS) receiver.

9. The method of claim 1, wherein the disabling step includes:
   transmitting a MAHO disable signal to each served mobile station for which the MAHO feature is to be disabled.

10. The method of claim 1, wherein the disabling step includes:
    transmitting a MAHO disable signal including an identifier for each served mobile station for which the MAHO feature is to be disabled.

11. The method of claim 2, wherein the disabling step disables the MAHO feature on a per mobile station basis.

12. A method for selectively disabling a mobile assisted handoff (MAHO) feature in a served mobile station, comprising:
    transmitting a triggering signal;
    receiving a disabling signal directed to the served mobile station the disabling signal indicating a determination by a serving base station to disable the MAHO feature; and
    disabling the MAHO feature in response to receiving the disabling signal.

13. The method of claim 12, wherein the triggering signal contains information from which a position of the served mobile station may be determined.

14. The method of claim 13, wherein the triggering signal indicates a signal transmission time.

15. The method of claim 13, wherein the triggering signal includes position coordinates of the served mobile station.

16. The method of claim 15, further comprising:
    generating the position coordinates by a global positioning system (GPS) receiver.

17. The method of claim 12, wherein the disabling step includes:
    ceasing to transmit signal quality information.

18. The method of claim 1, further comprising:
    receiving an enabling signal directed to the served mobile station; and
    enabling the MAHO feature in response to the enabling signal.

19. A method for selectively disabling a mobile assisted handoff (MAHO) feature in a served mobile station, comprising:

transmitting a triggering signal;

receiving a disabling signal, the disabling signal indicating a determination by a serving base station to disable the MAHO feature;

determining whether the served mobile station is identified in the disabling signal; and disabling the MAHO feature if in response to determining that the served mobile station is identified in the disabling signal.

20. The method of claim 19, herein the triggering signal contains information from which a position of the served mobile station may be determined.

21. The method of claim 20, wherein the triggering signal indicates a signal transmission time.

22. The method of claim 20, wherein the triggering signal includes position coordinates of the served mobile station.

23. The method of claim 22, further comprising:

generating the position coordinates by a global positioning system (GPS) receiver.

24. The method of claim 19, wherein the disabling step includes:

ceasing to transmit signal quality information.

25. The method of claim 19, further comprising:

receiving an enabling signal including an identifier for the served mobile station;

determining whether the served mobile station is identified in the enabling signal; and enabling the MAHO feature if the served mobile station is identified in the enabling signal.

26. A method for selectively processing channel quality measurements, comprising:

receiving channel quality measurements at a serving base station;

receiving a triggering signal at the serving base station; and determining at the serving base station whether to disable the channel quality measurements based on the triggering signal.

27. The method of claim 26, wherein the triggering signal is received via an input device at one of a base station and a mobile switching center.

28. The method of claim 27, wherein the triggering signal specifies each served mobile station for which the channel quality measurements are not to be processed.

29. The method of claim 26, wherein the triggering signal is received from a served mobile station, and the determining step includes:

determining from the triggering signal whether the served mobile station has moved from a previous position, and deciding not to process the channel quality measurements from the served mobile station if the served mobile station has not moved from its previous position.

30. The method of claim 29, further comprising:

processing the channel quality measurements from the served mobile station if the served mobile station has moved from its previous position.

31. The method of claim 29, wherein the determining from the triggering signal step includes:

deriving a relative position of the served mobile station from a signal progation time delay between the served mobile station and the serving base station.

32. The method of claim 29, wherein the determining from the triggering signal step includes:

deriving a position of the served mobile station from an output of a position measuring means included in the triggering signal.

33. The method of claim 32, wherein the position measuring means includes a global positioning system (GPS) receiver.

* * * * *